United States Patent
Ilkhanov et al.

(10) Patent No.: US 8,961,225 B2
(45) Date of Patent: Feb. 24, 2015

(54) FLEXIBLE WATER-TIGHT SEAL FOR A MOVABLE COMPONENT

(75) Inventors: Azer Ilkhanov, Brooklyn, NY (US); Peter J. Burke, East Northport, NY (US); Sai Fung, Melville, NY (US); Leo Brenna, Northport, NY (US)

(73) Assignee: Bren-Tronics, Inc., Commack, NY (US)

( * ) Notice: Subject to any disclaimer, the term of this patent is extended or adjusted under 35 U.S.C. 154(b) by 9 days.

(21) Appl. No.: 13/422,097

(22) Filed: Mar. 16, 2012

(65) Prior Publication Data

US 2013/0241160 A1 Sep. 19, 2013

(51) Int. Cl.
*H01R 13/40* (2006.01)

(52) U.S. Cl.
USPC ........... 439/587; 277/650; 277/603; 277/608; 277/609; 277/616; 285/349; 285/351; 285/368

(58) Field of Classification Search
USPC ......... 277/603, 608, 609, 616, 626, 627, 630, 277/637, 644, 650, 651, 654; 285/349, 351; 285/368; 439/275, 279, 283, 587, 588, 504; 136/232
See application file for complete search history.

(56) References Cited

U.S. PATENT DOCUMENTS

| | | | |
|---|---|---|---|
| 1,329,398 A * | 2/1920 | Hachmann | 210/495 |
| 2,849,244 A | 8/1958 | Sampson | |
| 2,860,019 A | 11/1958 | Osmun | |
| 3,519,279 A | 7/1970 | Wagner | |
| 4,192,519 A * | 3/1980 | Buggele | 277/638 |
| 4,632,591 A | 12/1986 | Fullenkamp | |
| 4,865,335 A | 9/1989 | McGann | |
| 5,174,611 A | 12/1992 | Byrd et al. | |
| 6,068,303 A * | 5/2000 | Hollnagle | 285/319 |
| 6,109,167 A | 8/2000 | Vertanen | |
| 6,139,026 A * | 10/2000 | Gruver, III et al. | 277/608 |
| 6,250,692 B1 * | 6/2001 | Ito et al. | 285/319 |
| 6,378,542 B1 | 4/2002 | DuHack | |
| 6,540,264 B1 * | 4/2003 | Yokoyama et al. | 285/319 |
| 6,547,255 B1 | 4/2003 | Donaway et al. | |
| 6,736,407 B2 * | 5/2004 | Tremoulet, Jr. et al. | 277/638 |
| 7,108,297 B2 * | 9/2006 | Takayanagi et al. | 285/319 |
| 7,354,079 B2 * | 4/2008 | Rehder et al. | 285/322 |
| 7,464,968 B2 * | 12/2008 | Sakazaki et al. | 285/242 |
| 7,475,913 B2 * | 1/2009 | Muto | 285/39 |
| 7,478,839 B2 * | 1/2009 | Barber | 285/281 |
| 8,167,339 B2 * | 5/2012 | Yagisawa et al. | 285/305 |
| 2002/0117853 A1 * | 8/2002 | Bartholomew | 285/305 |
| 2004/0195829 A1 * | 10/2004 | Cummins | 285/231 |
| 2007/0048476 A1 | 3/2007 | Park | |
| 2008/0018059 A1 * | 1/2008 | Otuka | 277/650 |
| 2011/0057394 A1 * | 3/2011 | Halling | 277/312 |

* cited by examiner

*Primary Examiner* — Kristina Fulton
*Assistant Examiner* — Eugene G Byrd
(74) *Attorney, Agent, or Firm* — Keusey & Associates, P.C.

(57) ABSTRACT

A flexible, water tight seal for a movable component. The seal has a border plate sandwiched between two sealing gaskets. The seal is compressed between two components that remain out of contact with each other. The seal is installed axially between the components. For components having circular contact areas, the seal can be constructed from a washer sandwiched between two O-rings. The components float on the compressed seal to allow some flexibility between the components while maintaining a water tight seal.

20 Claims, 7 Drawing Sheets

FIG. 1 *(Prior Art)*

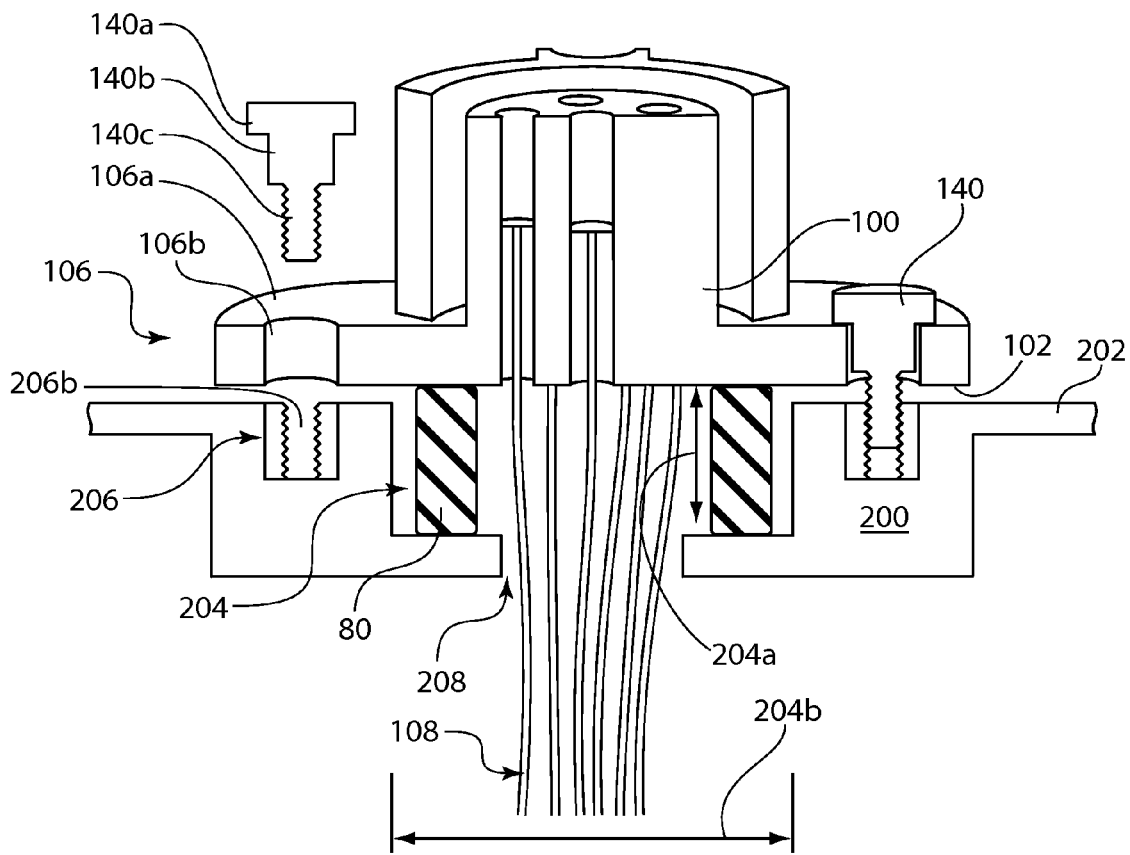
FIG. 3A *(Prior Art)*

FLEXIBLE WATER-TIGHT SEAL FOR A MOVABLE COMPONENT

BACKGROUND

1. Technical Field

The invention relates to a flexible water-tight seal for a movable component.

2. Description of the Related Art

In various mechanical and electrical manufacturing applications, there is a need to couple two components together. Some coupled components will remain fixed and stationary with respect to each other. In such cases, it is relatively easy to place an O-ring or gasket between the parts and clamp them tightly together. In other cases, it is desirable to have the components remain moveable with respect to each other. For example, one component may need to absorb vibration, removably couple to another device such as a connector, or otherwise float or flex to accomplish an intended function.

U.S. Pat. No. 5,174,611 describes a push-in fitting assembly for pneumatic air line connections, compatible fluids, and low-pressure hydraulic lines. The patent uses a series of collars and angled surfaces to wedge the two parts into a fixed connection. The parts are secured axially and radially to each other by the collars with O-rings and washers providing a sealing function only. The releasable coupling proposed by the patent is shown in greater detail in FIG. 1 as an example of the prior art. The component parts are rigidly coupled together along an axial direction. The O-rings are then disposed radially between the two components.

U.S. Pat. No. 2,849,244 discloses O-rings and separator rings which seal passages in a rotating cylinder having a reciprocative piston rod therein. The O-rings form a sealing assembly wherein the O-ring farthest from the pressure source is capable of sufficient leakage to hold to a minimum pressure gradient. U.S. Pat. No. 6,378,542 describes O-rings that seal a guide tube to a valve body in an appliance water valve. Other background patents include U.S. Pat. No. 2,860,019 and U.S. Pat. No. 4,632,591 and U.S. Pat. No. 6,109,167.

The prior art discloses O-rings used as conventional fluid seals between parts that are coupled together. More specifically, the prior art shows components that are in direct contact with each other and rigidly coupled together, for example in a telescoping arrangement. Accordingly, there is no suggestion to sandwich a border plate between two sealing gaskets to form a flexible seal. The prior art does not show such a seal disposed axially between components. Furthermore, the prior art does not employ the seal in a connection where the components do not actually touch each other. Therefore, a need exists for such a simple and low cost seal that allows the components to move with the joint remaining water-tight.

SUMMARY OF THE INVENTION

It is therefore an object of the invention to provide a flexible water-tight seal for a moveable component.

It is another object of the invention to provide such a seal by stacking two sealing gaskets and a border plate in compression.

It is a further aspect of the invention to provide two O-rings and a washer which form multiple annular or circular lines of contact.

It is a further object to provide a stack seal that can include additional O-rings and washers to accommodate any gap between the components.

It is another object to provide such a stack seal where the annular lines of contact remain watertight even when the components slide or tilt with respect to each other.

According to a first embodiment of the invention, an apparatus provides a flexible water-tight seal between a first surface of a first component and a second surface of a second component. The apparatus includes a seal having a border plate with two sides sandwiched between two sealing gaskets, where each sealing gasket forms a seal against one of the surfaces and one side of said border plate. The seal is compressively disposed in a gap formed between the first and second surfaces so that the seal remains water-tight when the first and second components move with respect to each other.

The seal includes two or more border plates and three or more sealing gaskets, with the border plates and sealing gaskets alternately layered in a sealing stack, with a sealing gasket disposed at the top and bottom of said sealing stack. The cross-sectional geometry of each sealing gasket is independently selected from the other. The perimeter shape of said sealing gaskets are approximately the same as the perimeter shape of said border plate, and where the perimeter shape is freely selected based on the surfaces to be sealed. The border plate comprises a washer and wherein said sealing rings comprise O-rings, where said washer and O-rings are of approximately the same perimeter shape.

The first planar surface faces in a first axial direction and the seal is stacked on the first planar surface extending in the first axial direction. The second planar surface compresses the seal in a second axial direction opposite the first axial direction toward the first planar surface. The second planar surface includes an aperture in registration with the center opening of the O-rings and washer, wherein an article can pass from said first components through the center opening of said O-rings and washer through the aperture in said second planar surface while said seal prevents environmental contaminants from entering the aperture.

The apparatus also includes a first coupling element on the first component and a second coupling element on the second component. A fastener is provided for securing to said first and second coupling elements with the first and second components sandwiching the seal therebetween. The first and second components remain in a spaced apart, non-contact relationship and are held apart by the biasing force of the seal. The fastener restricts the first coupling element in one dimension, namely, an axial direction away from the second coupling. The said second planar surface can move against the biasing force of said seal. The second planar surface retains multiple degrees of freedom whereby the second planar surface can move (i) radially, (ii) axially toward the first planar surface, and (iii) out of parallel alignment with respect to the first planar surface.

The fastener adjustably draws the second coupling element toward said first coupling element so that the first and second couplings compress the seal to form a flexible, fluid tight joint. The first and second couplings avoid direct contact with each other, and the first and second couplings float on said compressed seal. The second component includes a well having a well depth and a well diameter with the bottom of the well being defined by the second planar surface. The seal is retained in axial alignment between said first and second components by the well. The seal has an uncompressed height of approximately 150% of the well depth, and the seal is compressed to approximately 120% of the well depth. The seal has a diameter of approximately 94% of the well diameter.

In an alternate embodiment there is an apparatus for providing a flexible water-tight seal including a first component having a first planar surface and a second component having a second planar surface. A seal having a border plate with two sides is sandwiched between two sealing gaskets, where each sealing gasket forms an annular seal against one of the planar surfaces and one side of the border plate. The seal is compressively disposed in a gap formed between the first and second planar surfaces so that the seal remains water-tight when the first and second components move with respect to each other.

The outer border or perimeter shape of the sealing gaskets are approximately the same as the perimeter shape of the border plate. The perimeter shape is freely selected based on the surfaces to be sealed. The cross-sectional geometry of each sealing gasket is independently selected from the other. For circular applications, the border plate is a washer and the sealing gaskets are O-rings. The components extend in an axial direction and the seal is disposed axially between the components.

The apparatus further includes a first coupling element on the first component and a second coupling element on the second component. A fastener is provided for securing to the first and second coupling elements while sandwiching the seal therebetween. The first and second components remain in a spaced apart, non-contact relationship and are held apart by the biasing force of the seal.

In a particular application of the seal according to the invention, the first component is a battery connector adapted to electrically connect to a device requiring battery power. The second component is a battery housing, wherein the seal maintains the interior of the battery housing water tight when the device flexes the connector upon connection and disconnection thereof.

BRIEF DESCRIPTION OF DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIG. 3A is a cross-sectional view of a prior art seal.

DETAILED DESCRIPTION OF PREFERRED EMBODIMENTS

Figure 1:
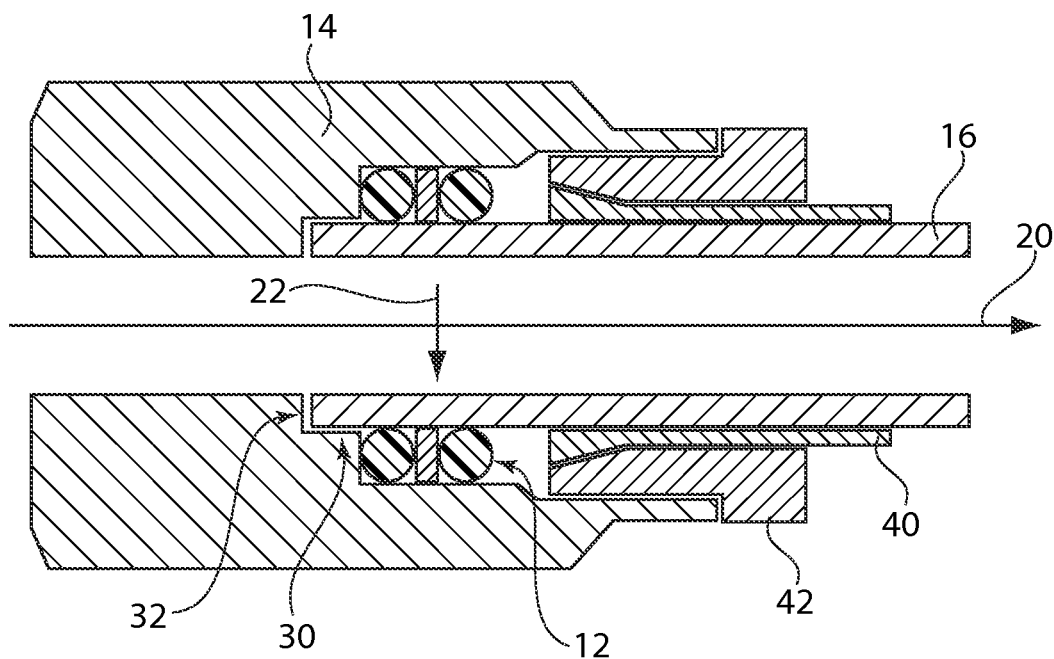
FIG. 1 is a cross sectional view of a prior art coupling.

These and other objects, features and advantages of the present invention will become apparent from the following detailed description of illustrative embodiments thereof, which is to be read in connection with the accompanying drawings.

The present invention provides an improved seal having greater flexibility and the ability to seal in immersion conditions. In its simplest form, the seal includes three parts, namely, a rigid layer disposed between two resilient layers. The rigid layer is referred to generically as a border plate, with a washer being used in circular seal applications. The resilient layers are referred to generically as sealing gaskets, with O-rings begin used in circular applications. The seal is well suited for placement between two components, where one component includes a well. The components include facing surfaces that need to be sealed across a gap that includes the height of the well plus a clearance amount to allow for component movement. Additional border plates and sealing gaskets may be added to fill the gap, for example alternating three or more sealing gaskets and two or more border plates. The number of sealing gaskets will be one more than the number of border plates. In other words, take the number of border plates plus 1 to obtain the number of sealing gaskets. The seal is configured to have a height that is greater than the gap. When the components are connected, the seal is compressed.

The seal can be utilized between facing surfaces of two components, where one component includes a well to retain the seal parts in place. The well may be located internal of the seal or external. The perimeter shape of the surfaces and well can be any closed figure. The "border" modifier of the border plate, means that the plate is configured to the shape of the surface and well. The sealing gaskets are also configured to the shape of the border plate.

The seal has improved reliability by providing a series of seals between the surfaces. At the external sides of the seal, a water tight connection is formed between the sealing gaskets and the corresponding surface of one of the components. Internally, a water tight seal is formed between the sealing gaskets and the border plate. The seal includes three or more parts, where each part comprises a low profile sealing element, with respect to the overall height between the facing surfaces. When the components move with respect to each other, the surfaces can shift, tilt, rock and/or move toward each other. The surface motion causes the sealing gaskets to further compress at certain points, and to expand at other points. The sealing gaskets are able to slide against the surfaces and border plate to maintain a seal during such surface motion.

In circular applications, the seal has reduced tooling and part cost by using standard off the shelf and readily available parts. The seal includes a stack of alternating O-rings and washers of approximately similar diameter. In the simplest embodiment, one washer is sandwiched between two O-rings. Typically one O-ring is disposed at the top of the stack and one at the bottom of the stack. Additional O-rings and washers could be added to create a taller stack, for example a five part stack having an O-ring, washer, O-ring, washer and O-ring. The seal is disposed axially between two components to provide a flexible, water-tight seal. The seal is particularly useful when the two components need a degree of movement between them. For the sake of clarity, the circular embodiment will be described first, with the generically shaped embodiments being described subsequently.

An example of a seal 12 according to the Prior Art is shown in FIG. 1 as disclosed in U.S. Pat. No. 5,174,611. The connection is formed between a first component 14, and a second component 16 which extend in an axial direction designated by arrow 20. The radial direction is designated by arrow 22. The components 14 and 16 are telescoped together and contact each other in the radial direction at location 30. The components 14 and 16 are further in contact with each other in the axial direction at location 32. The seal 12 is disposed radially between the interior of first component 14 and the exterior of second component 16. The components are held rigidly together by a pair of sloping surfaces on locking collars 40 and 42 which are wedged together to secure the connection. The locking collars 40 and 42 provide further radial stabilization between components 14 and 16. Accordingly, the prior art seal is used for components that are in contact with each other, and is disposed radially between the components. The prior art seal is part of a connection where the components are rigidly secured together. Finally, the prior art seal 12 is not disposed between planar surfaces of the respective components 14 and 16, much less parallel planar surfaces.

Figure 2:
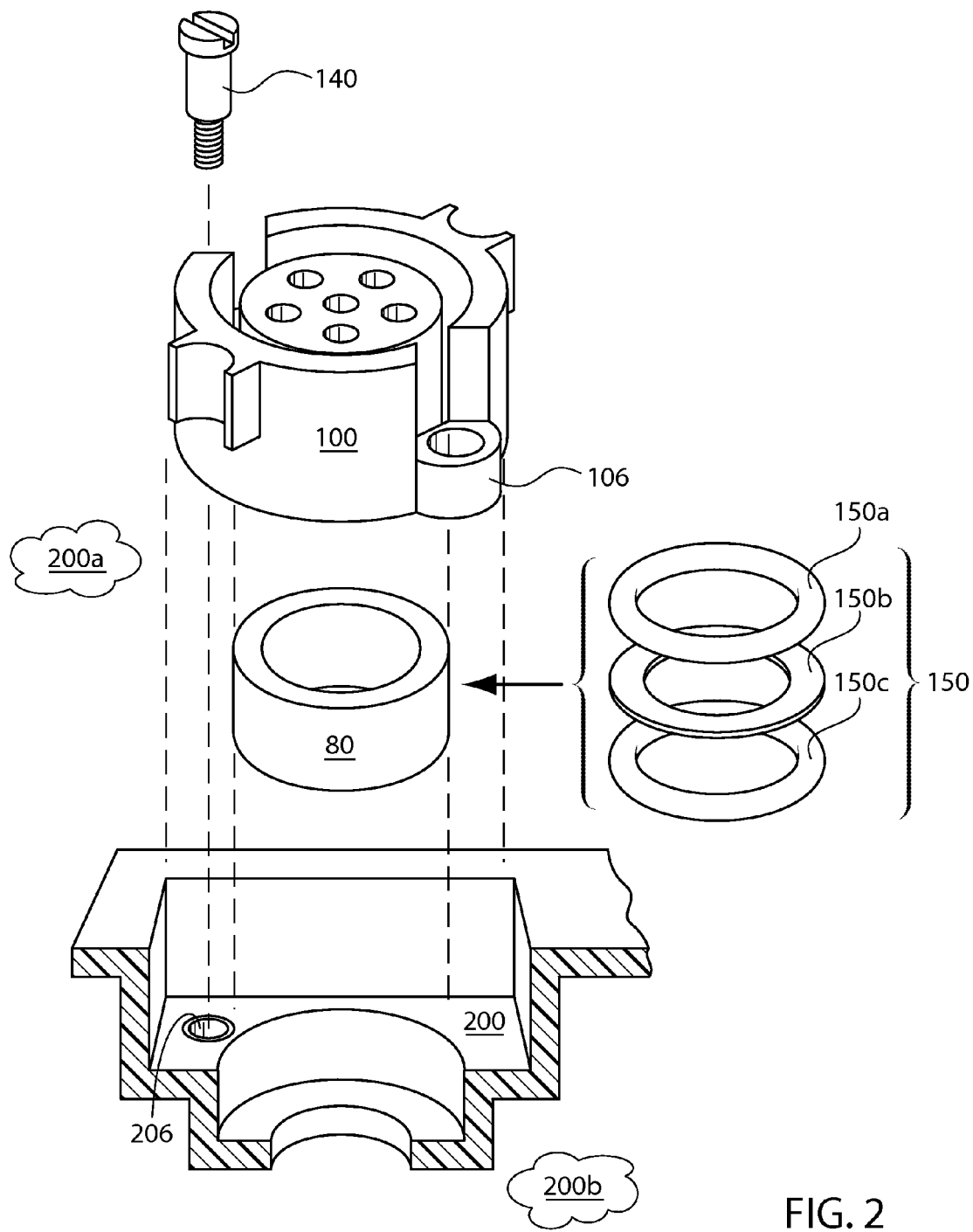
FIG. 2 is an exploded view of seals that are disposed between two components.

As can be seen in FIG. 2 there is shown an exploded view of an exemplary first component 100, prior art seal 80, an embodiment of the seal 150 according to the invention, and an exemplary second component 200. First component 100 includes a first planar surface 102 (not shown for the sake of clarity) on the lower surface thereof, e.g. a flat bottom. Second component 200 includes a second planar surface 202. Several of the reference numerals may be seen in the cross-sectional view of FIG. 3A. When connected together in a resting state, the first planar surface 102 will be parallel to second planar surface 202. Second component 200 includes a well 204 having a depth 204a. First component 100 includes a first coupling 106, which may be configured as a coupling ear, threaded or unthreaded bore, flange or other suitable mechanical element. Second component 200 includes a second coupling 206, which may be configured as a coupling ear, threaded or unthreaded bore, flange or other suitable mechanical element.

In the illustrated embodiment, first coupling 106 includes an ear 106a and an unthreaded bore 106b. Second coupling 206 consists of a threaded bore 206b. A bolt 140 is provided having a head 140a, a shank 140b and threaded portion 140c. To assemble the components, the seal 80 is disposed within well 204 with first component 100 stacked on top of seal 80. Two bolts 140 are placed through unthreaded bore 106b and screwed into threaded bore 206b. According to the invention, seal 150 including top O-ring 150a, middle washer 150b and bottom O-ring 150c replaces prior art seal 80.

It should be noted that the seal 150 according to the invention can be used in a variety of applications where a flexible, water-tight seal is desirable. In addition, seal 150 may be employed where one component may need to absorb vibration, removably couple to another device such as a connector, or otherwise float or flex to accomplish an intended function. Seal 150 will work effectively in connections having two spaced, parallel surfaces that face each other and need to be flexibly sealed. The connection shown in FIG. 2 is intended to be a non-limiting example.

In FIG. 2, second component 200 represents a housing, for example a battery housing. The exterior environment 200a is on one side of second component 200, opposite the interior 200b. An aperture 208 is formed through second component 200 to allow wire leads 108 to extend from the bottom of first component 100 into the housing. Accordingly, the first planar surface 102 needs to be sealed to second planar surface 202 to prevent moisture, fluids, water and other contaminants from passing from environment 200a to interior 200b.

As can be seen in FIGS. 2 and 3A, well 204 includes a well depth 204a and a well diameter 204b. The prior art seal 80 consists of a tubular piece of rubber, e.g. a section of rubber tubing. The tubing inner diameter is selected to be less than well diameter 204b and the height of the tubing is selected to be greater than well depth 204a. The first planar surface 102 sits on tubing. The first coupling 106 is spaced from second coupling 206. Bolts 140 are screwed in to slightly compress the tubing, thereby providing a seal between first planar surface 102 to the top of the tube, and a further seal between the bottom of the tube and second planar surface 202.

Figure 4A:
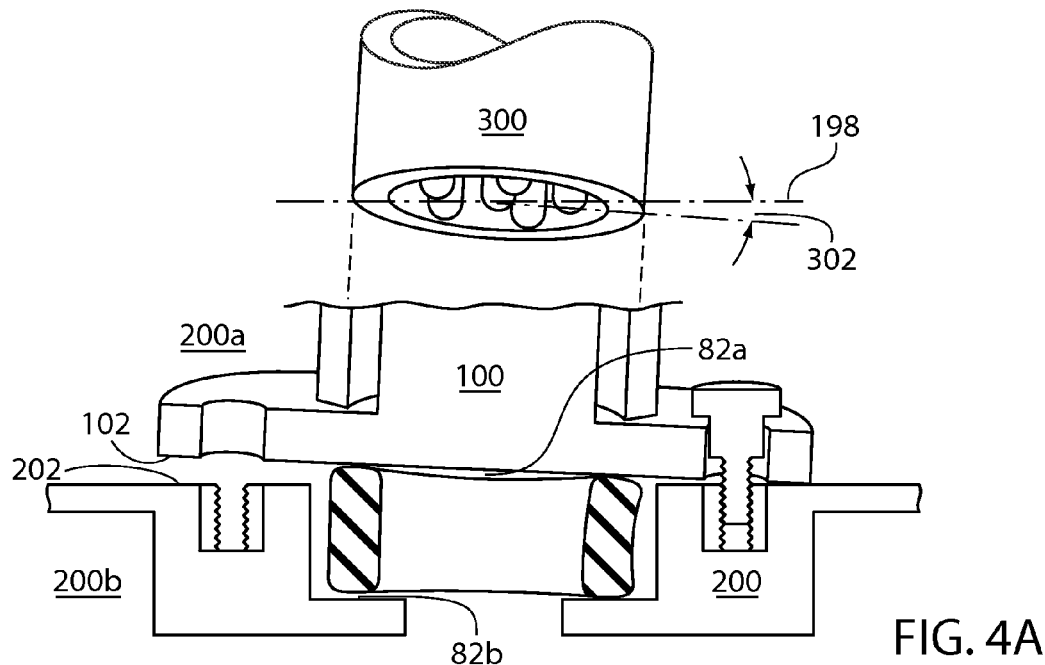
FIG. 4A is an enlarged cross-sectional view showing the prior art seal in use.

Tubular seal 80 provides a relatively good water-tight connection when the assembly is in its resting state. However, a problem arises when first component 100 is rocked, flexed, tilted or moved. FIG. 4A shows a plug 300 that is intended to plug into first component 100. Line 198 represents a plane that is parallel with planar surfaces 102 and 202. Angle 302 represents an angular displacement to the plug's orientation upon connection, use, or disconnection. Tubular seal 80 is prone to buckling which can create openings in the seal, for example an upper gap 82a can form between seal 80 and first planar surface 102 or a lower gap 82b can form between seal 80 and second planar surface 202. Because of the tubular shape, an axial compression on one part of the tube can cause other parts of the tube to bend or distort in unpredictable ways, like an aluminum can or plastic cup when partially reduced in height.

Figure 3B:
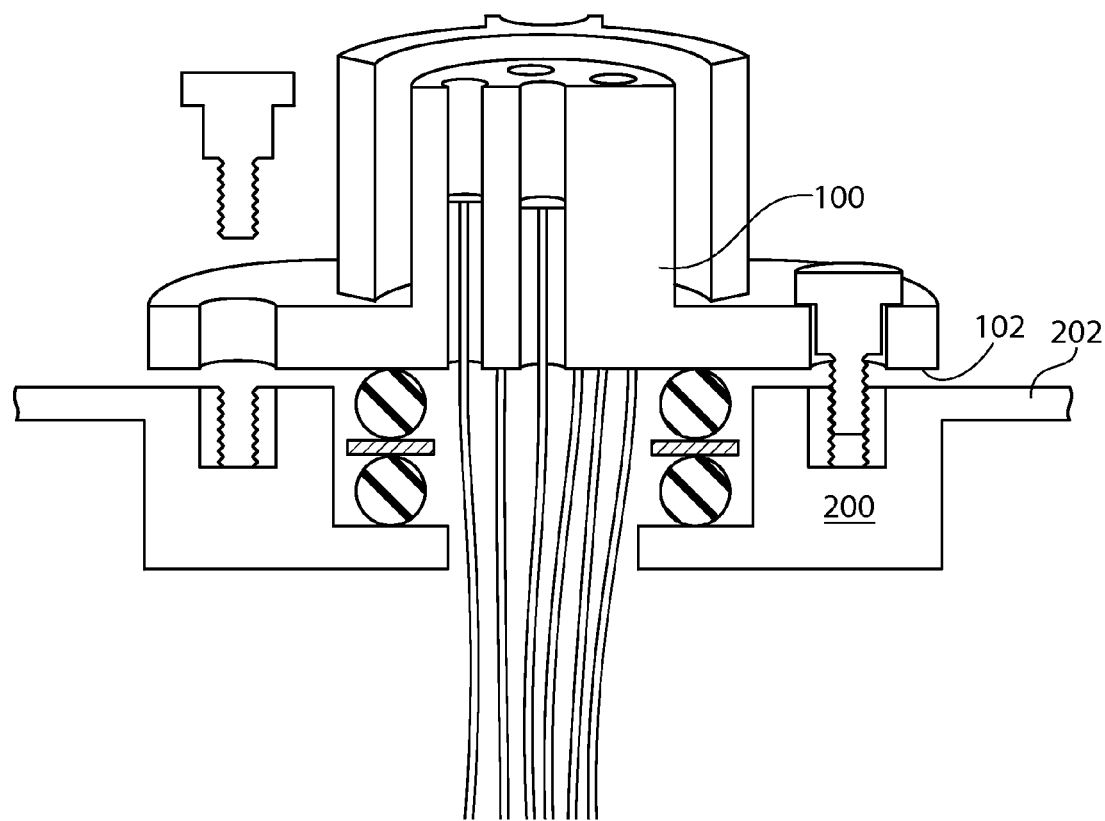
FIG. 3B is a cross-sectional view of an embodiment of a seal according to the invention.

As can be seen in FIGS. 2 and 3B, well 204 includes a well depth 204a and a well diameter 204b. The seal 150 according to the invention includes a top O-ring 150a, a central washer 150b and a lower O-ring 150c. The components of seal 150 are selected to have a combined stack height of 130% to 170%, preferably 150% of the well depth 204a. For example, a seal with a stack height of about 0.3 inch was installed in a well having a depth of 0.2 inch.

The seal components will be retained in place by being suitably sized with respect to the well diameter and the degree of flexibility required between the components. The seal diameter is 90% to 98%, preferably 94% of the well diameter. The 6% of additional space allows the seal components to shift slightly to accommodate angling planar contact surfaces 102, 202. For example, an O-ring seal with a diameter of about 0.75 inch was installed in a well having a diameter of about 0.80 inch. Alternatively, the seal components could be retained by a cylinder or post disposed within the central openings of the O-rings and washer. For example a post having an outer diameter that is 90% to 98%, preferably 94% of the diameter of the O-ring/washer openings. For other perimeter shapes, the seal could be 94% of the well width, in any direction.

The three components are selected with inner and outer diameters that are approximately the same. Top O-ring and bottom O-ring may be two of the same part. The O-rings are selected to have a Durometer between 30 and 70, preferably 50. In certain applications, one of the O-rings may be a different size, shape or have different material characteristics. The washer can be a convention spacer washer made from metal, plastic or other suitable material.

The inner diameter of seal 150 is selected to be less than well diameter 204b and the height is selected to be greater than well depth 204a. The first planar surface 102 sits on seal 150. The first coupling 106 is spaced from second coupling 206. Bolts 140 are screwed in to slightly compress seal 150, thereby providing a seal between first planar surface 102 to the top of O-ring 150a, and a further seal between the bottom of O-ring 150c and second planar surface 202. During installation, bolts may be screwed in to generate a compressive force on the seal 150 of between 3 lbs. and 20 lbs., preferably 10 lbs. If the O-rings have the same material properties, they will both compress to the same extent, forming uniformly oval cross-sections as illustrated in FIG. 3B. When installation is completed, the seal 150 may be compressed between 5% and 25%, preferably 15% of the original stack. Accordingly, the fully installed first component 100 will be floating above second component 200 a distance equal to approximately 125% of the well depth 204*a*. For example, the 0.3 inch stack is compressed to 0.25 inch. The first component will be floating 0.05 inches above the second component. (0.25/0.20)100=125%.

As the O-rings compress they form an annular shaped seal to their neighboring components. In a three dimensional space, annular can mean donut or ring-shaped, like an inner tube. In this application, we use the term "annular" to refer to a two dimensional geometric shape. For example, annular will mean the planar area between two concentric circles. These annular areas will occur on parallel surfaces as described further below. Consider an O-ring placed on a first flat surface and compressed by a second flat surface that moves toward the first surface. The surfaces remain parallel with each other. The O-ring will make an annular contact patch with each surface. As the O-ring is compressed further, the size of the annular contact patch will increase. The inner circle will decrease in size and the outer circle will increase in size. This scenario is descriptive of the O-ring contact patches upon installation of the first component 100 onto the second component 200 as shown in FIG. 3B. In the parallel state the planar surfaces 102, 202 remain parallel with each and parallel with the opposed flat surfaces of washer 150*b*. The top O-ring will make an annular contact patch with first planar surface 102 and the top flat surface of the washer. The bottom O-ring will make an annular contact patch with the bottom flat surface of the washer and the second planar surface 202. The size of the annular patch can vary as a function of the compression level. The greater the compressive force, the larger the patch will become.

Figure 5:
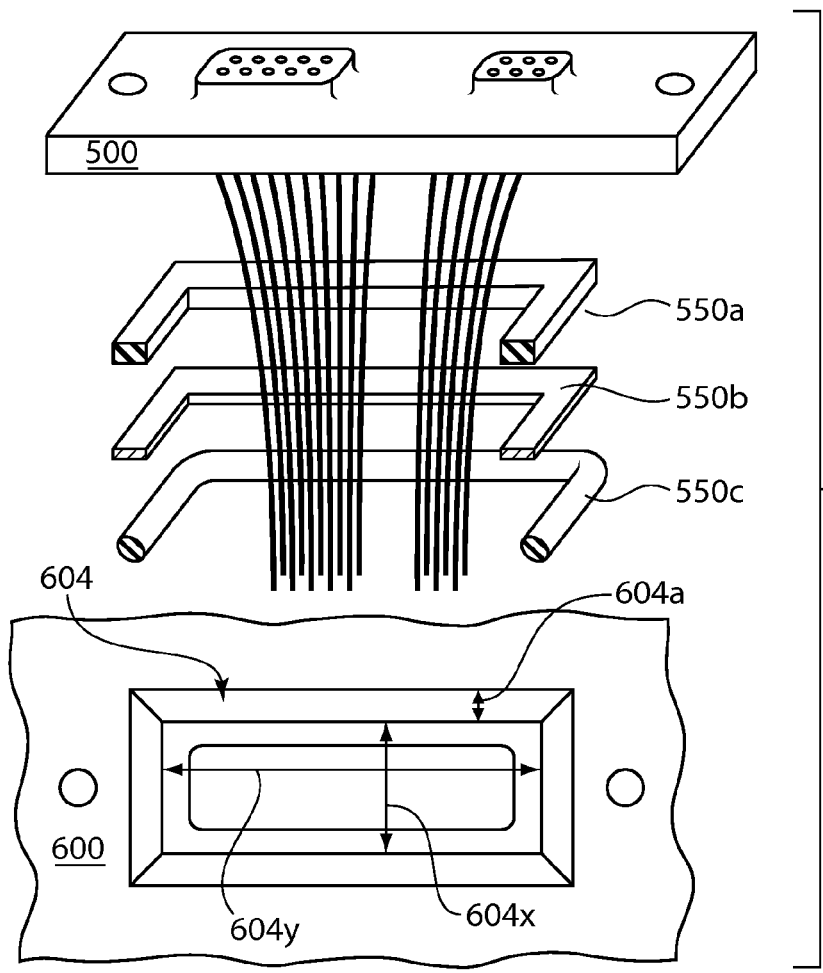
FIG. 5 is an exploded schematic view of an alternate seal showing different cross-sectional geometries of the sealing gaskets according to the invention.
Figure 6A:
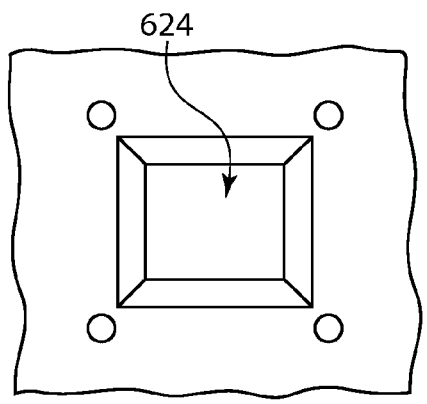
FIGS. 6A and 6B are plan views of components having different perimeter shapes.
Figure 6B:
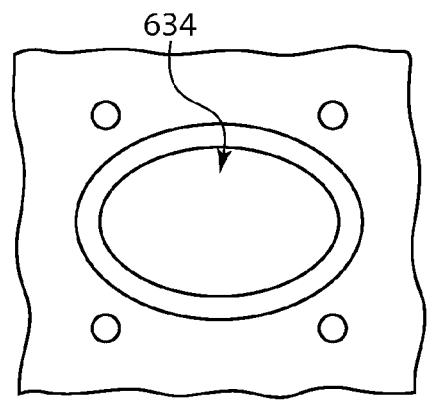

For the sake of simplicity, the description up to this point has focused on O-rings and washers. Is should be understood that the inventive concepts can also be applied to seals of different perimeter shapes. While FIG. 2 shows a round, planar surface to be sealed, FIGS. 5 and 6A and 6B show a rectangular perimeter shape, a square perimeter shape and an oval perimeter shape, respectively. The seal according to the invention can be used with any perimeter shape that represents a closed figure. For any given shape, the seal provides a border plate having an outer dimension slightly smaller than the perimeter shape of the surface to be sealed. The border plate is disposed between two sealing gaskets. The sealing gaskets also have an outer dimension slightly smaller than the perimeter shape to be sealed.

As shown in FIG. 5, the rectangular perimeter shape consists of a rectangular well 604 having a width 604*x* and a length 604*y*. The well 604 provides a location where the seal sits to provide a water tight seal between the lower surface of first component 500 and the upper surface of second component 600. The border plate 550*b* and the two sealing gaskets 550*a* and 550*c* would have depth and width dimensions slightly smaller than width 604*x* and length 604*y*. For example, the seal would be 94% smaller than width 604*x* and also 94% smaller than length 604*y*. FIG. 6A illustrates a square perimeter shape consisting of a square well 624. The border plate and sealing gaskets for square well 624 would have a similar, but slightly smaller square shape. FIG. 6B illustrates an oval perimeter shape consisting of an oval well 634. The border plate and sealing gaskets for oval well 624 would have a similar, but slightly smaller oval shape.

Figure 7A:
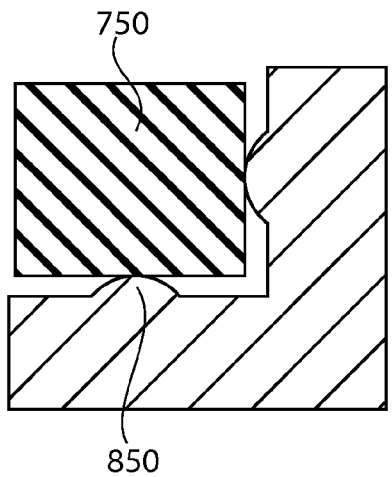
FIGS. 7A, 7B and 7C are cross-sectional views of sealing gaskets having various cross-sectional geometries to meet particular system design constraints.
Figure 7B:
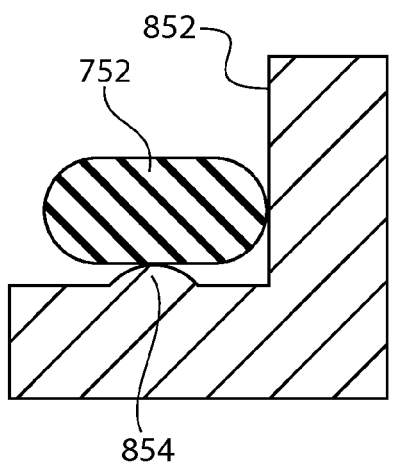
Figure 7C:
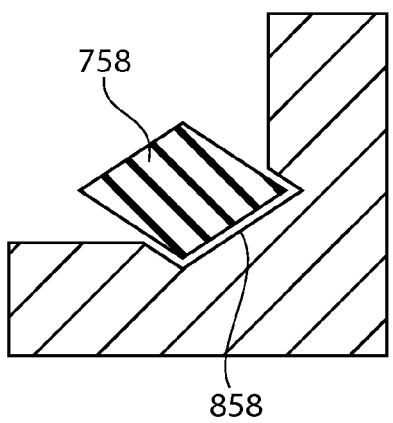

Each well has a well depth, represented in FIG. 5 by well depth 604*a*. In addition to different perimeter shapes, the seal according to the invention can use sealing gaskets of different cross-sectional geometry. While O-rings are generally circular in cross-section, FIGS. 7A and 7B and 7C show cross sectional geometries being square, elliptical and diamond, respectively. FIG. 7A shows the same annular sealing surface being created between a square or rectangular sealing gasket 750 and a component having a rounded surface 850. FIG. 7B shows a sealing gasket 752 with a rounded surface to contact flat wall 852, and a flat surface to contact rounded surface 854. FIG. 7C shows a diamond shaped sealing gasket 758 to contact a U-shaped recess in wall 858.

The key features of the invention are that the border plate and the sealing gaskets should be of similar perimeter shape to each other. That perimeter shape will be closely matched to the perimeter shape of the well surrounding the sealing surface. The cross-sectional geometry of the sealing gasket may be selected independently from the perimeter shape. The determination of the perimeter shape and the cross-sectional geometries will be based on the system design constraints. In other words, what are the environmental conditions that the seal will experience, how much relative movement is required between the surfaces to be sealed and what are the shapes and contours of the contact surfaces where the sealing gaskets will sit. The sealing gaskets may be made from rubber, flexible plastic, and other natural and synthetic materials that are closed cell or water impermeable.

Figure 4B:
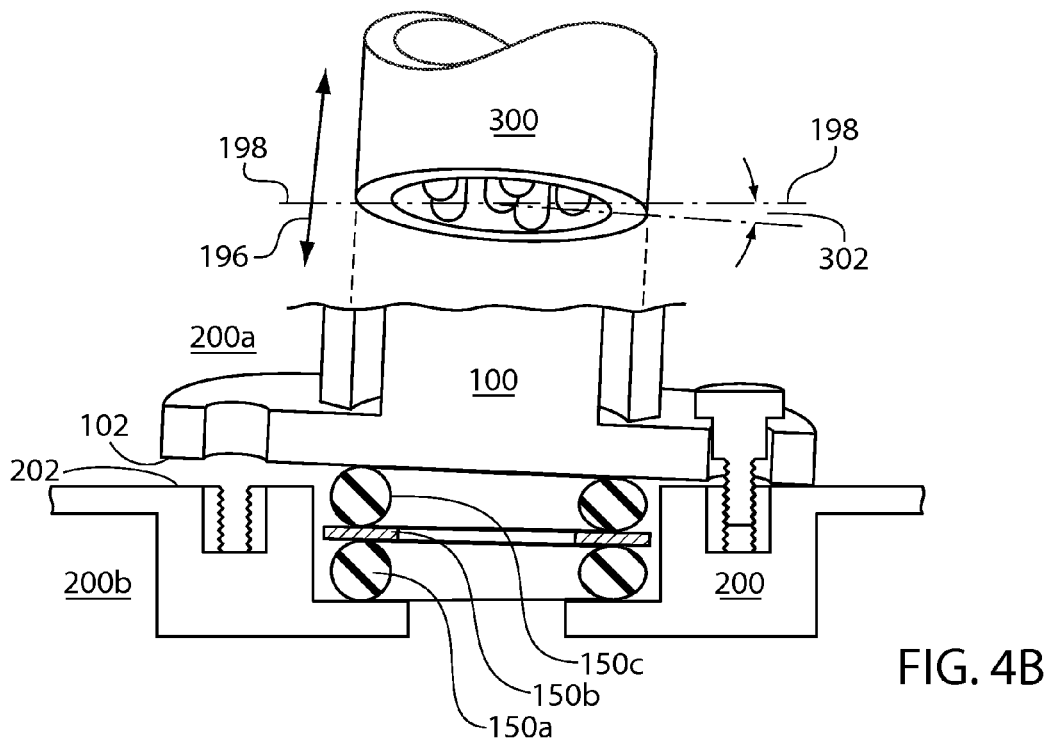
FIG. 4B is an enlarged cross-sectional view showing the seal according to the invention in use.

The sealing gaskets and border plates provide an effective seal between movable surfaces, as will be explained with respect to the O-ring embodiment. FIG. 4B shows a plug 300 that is intended to plug into first component 100 that may cause first component 100 to rock, flex, tilt or move. Line 198 represents a plane that is parallel with planar surfaces 102 and 202. Angle 302 represents an angular displacement to the plug's orientation upon connection, use, or disconnection. Because of the two O-rings, there are four independent circular sealing surfaces that can adjust and accommodate the displacement of the planar surfaces 102 and 202 with respect to each other. The top O-ring seals to first planar surface 102 and the top of the washer, while the bottom O-ring seals to bottom of the washer and the second planar surface 202. Arrow 196 represents lateral movement of plug 300 in the X-Y plane, i.e. in a plane parallel to line 198 and the planar surfaces 102, 202.

Accordingly, when the planar surfaces are moved with respect to one another, part of the seal can be further compressed while another part expands independently of each other. For example, part of the top O-ring can be further compressed while another part of the lower O-ring expands. The O-rings can also slide in a radial direction without binding, and grease or other suitable lubricant may be added to the seal parts to facilitate such sliding.

Within this application, annular will also mean the planar area between two non-concentric circles or between two ovals. These annular areas will occur on non-parallel surfaces as described below. Consider an O-ring placed on a first flat surface and compressed by a second flat surface that moves toward the first surface. The surfaces are non-parallel to each other. The O-ring will make an oval-shaped annular contact patch with each surface. This scenario is descriptive of the O-ring contact patches upon installation of the first component 100 onto the second component 200 as shown in FIG. 4B. As first planar surface 102 tilts to the right, the right side of the O-rings will undergo greater compression that the left sides. Accordingly, O-ring 150*a* makes a larger contact patch on the right side of first contact surface 102 and the top surface of washer 150*b*, than on the left sides thereof. Correspondingly, the bottom O-ring 150*c* will make a larger contact patch on the right side of the washer and the second planar surface 202, than on the left sides thereof. The size of the annular patch can vary as a function of the compression level. The greater the compressive force, the larger the patch will become.

The completed assembly provides a simple and inexpensive seal between two facing surfaces that need to be sealed, for example, parallel planar surfaces. The seal uses standard parts in a particular stacked configuration in between axially spaced components.

Having described preferred embodiments for (which are intended to be illustrative and not limiting), it is noted that modifications and variations can be made by persons skilled in the art in light of the above teachings. The O-rings and washer may be made or a variety of materials having various mechanical characteristics. The cross-sectional shapes of the seal parts may be varied. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for providing a flexible water-tight seal between a battery housing and an electrical battery connector that is adapted to receive a plug of a device requiring battery power comprising:
    a first component comprising an electrical battery connector having wire leads, a first planar surface and a first coupling element;
    a second component comprising a battery housing having a second planar surface facing said first planar surface and a second coupling element;
    a seal having a border plate with two sides sandwiched between two sealing gaskets, where each sealing gasket forms a seal against one of the planar surfaces and one side of said border plate, wherein said wire leads extend from said electrical battery connector through a center opening of said border plate and sealing gaskets into said battery housing; and
    a fastener for securing to said first and second coupling elements with said first and second components compressively sandwiching said seal therebetween with said first and second components disposed in an axially spaced apart, non-contact relationship and held apart by a biasing force of said seal;
    wherein said seal is axially compressed between the first and second planar surfaces so that the seal remains water-tight when a plug of a device requiring battery power is plugged into said electrical battery connector causing the first and second components to move with respect to each other.

2. The apparatus of claim 1, wherein said two sealing gaskets have the same cross-sectional shape.

3. The apparatus of claim 1, wherein said two sealing gasket have cross-sectional shapes which are different from each other.

4. The apparatus of claim 1, wherein the perimeter shape of said sealing gaskets are approximately the same as the perimeter shape of said border plate.

5. The apparatus of claim 1, wherein the border plate comprises a washer and wherein said sealing gaskets comprise O-rings, where said washer and O-rings are of approximately the same perimeter shape.

6. The apparatus of claim 5, wherein said first planar surface faces in a first axial direction; wherein said seal is stacked on said first planar surface extending in the first axial direction; and wherein said second surface compresses said seal in a second axial direction opposite said first axial direction toward said first planar surface.

7. The apparatus of claim 6, wherein said second planar surface includes an aperture in registration with the center opening of said O-rings and washer, wherein an article can pass from said first components through the center opening of said O-rings and washer through the aperture in said second planar surface while said seal prevents environmental contaminants from entering the aperture.

8. The apparatus of claim 1, wherein said fastener restricts said first coupling element in one dimension comprising an axial direction away from said second coupling, and wherein said second planar surface can move against the biasing force of said seal.

9. The apparatus of claim 8, wherein said second planar surface retains multiple degrees of freedom whereby said second planar surface can move (i) radially, (ii) axially toward said first planar surface, and (iii) out of parallel alignment with respect to said first planar surface.

10. The apparatus of claim 9, wherein said fastener adjustably draws the second coupling element toward said first coupling element so that said first and second couplings compresses the seal to form a flexible, fluid tight joint, and wherein the first and second couplings avoid direct contact with each other, and wherein the first and second couplings float on said compressed seal.

11. The apparatus of claim 6, wherein said second component includes a well having a well depth and a well diameter with the bottom of the well being defined by said second planar surface, and wherein said seal is retained in axial alignment between said first and second components by the well.

12. The apparatus of claim 11, wherein said seal has a height of approximately 150% of the well depth, and wherein the seal is compressed to approximately 120% of the well depth.

13. The apparatus of claim 11, wherein said seal has a diameter of approximately 94% of the well diameter.

14. An apparatus for providing a flexible water-tight seal between a battery housing and an electrical battery connector that is adapted to receive a plug of a device requiring battery power comprising:
    an electrical battery connector having wire leads and a first planar surface;
    a battery housing having a second planar surface, wherein said second component is secured to said first component in an axially spaced apart, non-contact relationship; and
    a seal having a border plate with two sides sandwiched between two sealing gaskets where each sealing gasket forms an annular seal against one of the planar surfaces and one side of the border plate, wherein said wire leads extend from said electrical battery connector through a center opening of said border plate and sealing gaskets into said battery housing,
    wherein said seal is compressively disposed in a gap formed between said first and second planar surfaces and biases the components away from each other so that said seal remains water-tight when a plug of a device requiring battery power is plugged into said electrical battery connector causing said first and second components move with respect to each other.

15. The apparatus of claim 14, wherein the perimeter shape of said sealing gaskets are approximately the same as the perimeter shape of said border plate, and wherein the perimeter shape is freely selected based on the surfaces to be sealed.

16. The apparatus of claim 15, wherein the cross-sectional geometry of each sealing gasket is independently selected from the other.

17. The apparatus of claim 16, wherein said border plate comprises a washer and wherein said sealing gaskets comprise O-rings.

18. The apparatus of claim 14, wherein said components extend in an axial direction and wherein said seal is disposed axially between said components.

19. The apparatus of claim 18, further including
- a first coupling element on said electrical battery connector and a second coupling element on said battery housing;
- a fastener for securing to said first and second coupling elements to each other thereby sandwiching said seal therebetween with said electrical battery connector and said battery housing remaining in a spaced apart, non-contact relationship and held apart by the biasing force of said seal.

20. The apparatus of claim 19, wherein said seal maintains the interior of the battery housing water tight when the device flexes the connector upon connection and disconnection thereof.

\* \* \* \* \*